Figure 1:
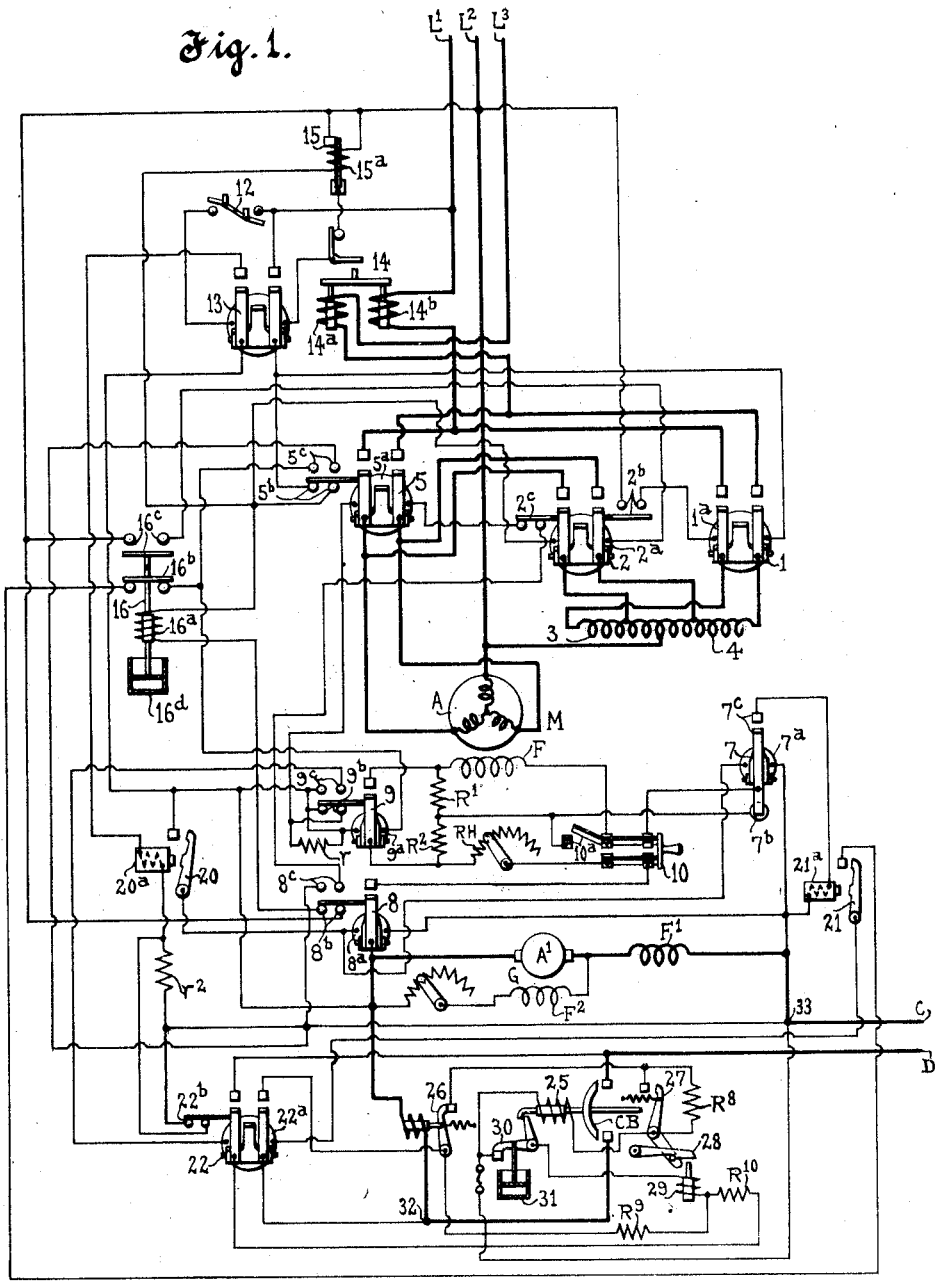

Sept. 2, 1930.  E. W. SEEGER  1,774,528
POWER DISTRIBUTION SYSTEM
Filed June 7, 1926  2 Sheets-Sheet 2

INVENTOR.
Edwin W. Seeger
BY
ATTORNEY.

Patented Sept. 2, 1930

1,774,528

UNITED STATES PATENT OFFICE

EDWIN W. SEEGER, OF SOUTH MILWAUKEE, WISCONSIN, ASSIGNOR, BY MESNE ASSIGNMENTS, TO CUTLER-HAMMER INC., OF MILWAUKEE, WISCONSIN, A CORPORATION OF DELAWARE

POWER-DISTRIBUTION SYSTEM

Application filed June 7, 1926. Serial No. 114,107.

This invention relates to power distribution systems, and is particularly applicable to controllers for automatic substations.

One object of the invention is to provide an improved automatic controller for substations of the type including a motor generator set.

Another object is to provide a controller of the aforesaid character in which relatively low starting voltage and normal operating voltage are consecutively applied to the motor generator set, and in which a thermal timing relay is employed to interrupt the starting connections if the transfer from starting to running is not made within a predetermined interval.

Another object is to provide a controller of the aforesaid character including means for insuring against opening and reclosure of the running switch upon voltage dips in the supply circuit.

Another object is to provide a controller of the aforesaid character including means for delaying connection of the generator to the distribution circuit upon establishment of the running connections to permit the motor to pull into step.

Another object is to provide a controller of the aforesaid character having improved means for controlling the field of the motor.

Various other objects and advantages of the invention will hereinafter appear.

The accompanying drawing diagrammatically illustrates an embodiment of the invention which will now be described, it being understood that the embodiment illustrated may be modified in certain respects without departing from the spirit and scope of the appended claims.

In the drawing:

Figure 1 diagrammatically illustrates a preferred form of the controller; and

Figure 2:
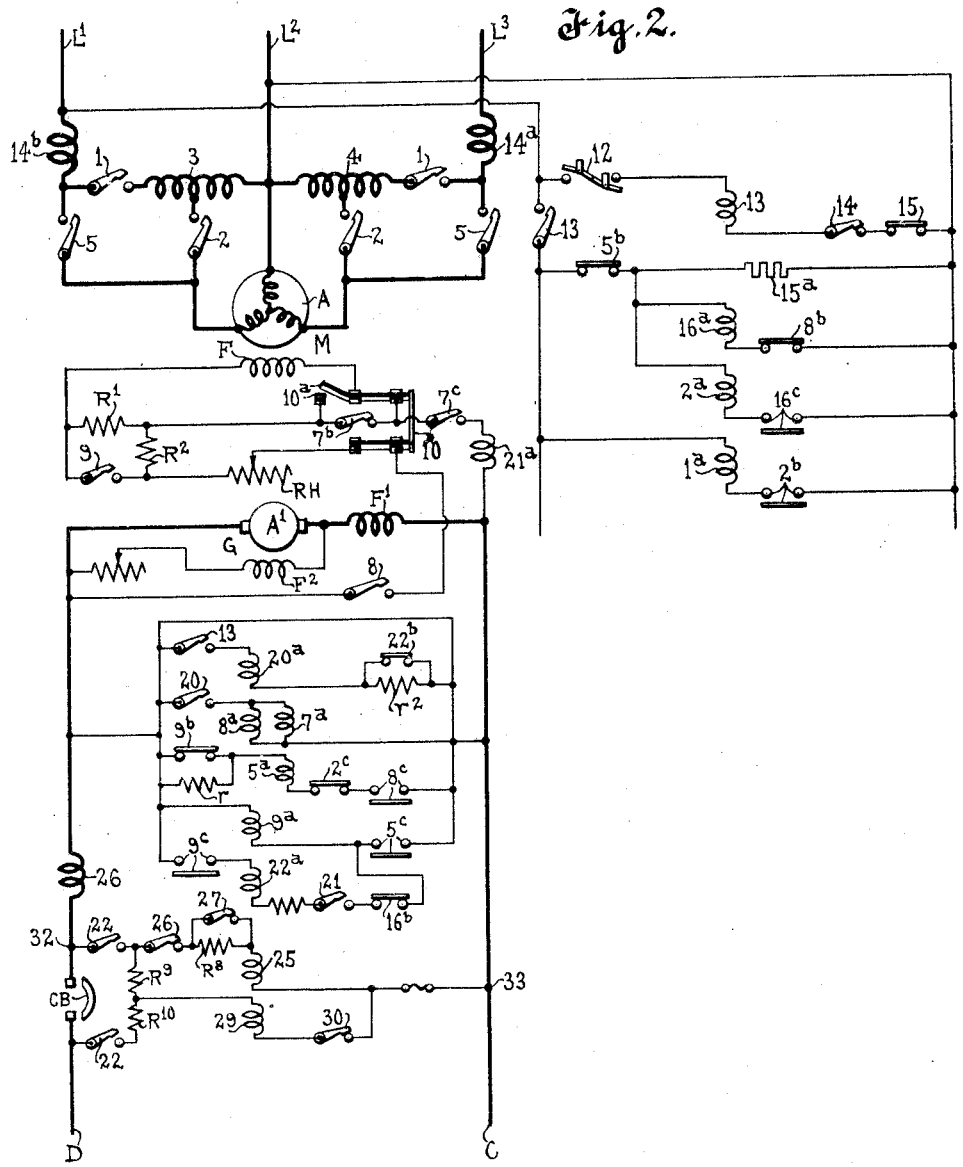

Fig. 2 is a so-called across-the-line diagram of the controller illustrated in Fig. 1.

Referring to Fig. 1, the same illustrates an automatic substation including a motor generator set, a three phase alternating current supply circuit indicated by lines $L^1$, $L^2$ and $L^3$, and a direct current distribution circuit indicated by lines D—C. The motor generator set includes an alternating current motor M having an armature A and a field F and a direct current generator G having an armature $A^1$, a series field $F^1$ and a shunt field $F^2$.

The control means includes a pair of double pole electromagnetic switches 1 and 2 for establishing low voltage starting connections from lines $L^1$, $L^2$ and $L^3$ to the armature A through the medium of compensator windings 3 and 4; and a double pole electromagnetic switch 5 for directly connecting said armature to said lines for running. The field of motor M is controlled by electromagnetic switches 7, 8 and 9 and a double pole knife switch 10. Switch 7 is provided with normally closed contacts $7^b$ and normally open contacts $7^c$, the former contacts being provided to connect the field F across a discharge resistance $R^1$ through the medium of the upper pole of knife switch 10. The field F is also arranged to be connected across resistance $R^1$ upon opening of knife switch 10 through the medium of auxiliary contacts $10^a$ associated with said knife switch. Switches 8 and 9 are both normally open, and as hereinafter set forth during starting of the motor said switches respond to connect the field F across the terminals of the generator, through the medium of the aforesaid resistance $R^1$, a second resistance $R^2$ and an adjustable rheostat RH. Switch 9 is also normally open and is responsive upon establishment of running connections to shunt the resistances $R^1$ and $R^2$. An automatic reclosing circuit breaker CB which will be hereinafter more fully described is provided for connecting the generator G to the distribution circuit D—C.

The automatic control means includes a master switch 12 for controlling a master relay 13 through the medium of an overload device 14 and a timing device 15. Overload device 14 includes a normally closed switch provided with operating windings $14^a$ and $14^b$ connected in different phases of the supply circuit, and the timing relay 15 comprises a bimetallic strip normally engaging a stationary contact and having a heating coil $15^a$ associated therewith which is controlled by the master relay 13 and also by normally closed auxiliary contacts 5$^b$ associated with running switch 5. The control means still further includes an electromagnetically operated timing relay 16, voltage responsive relays 20 and 21 and a circuit breaker controlling relay 22. Timing relay 16 is controlled by the master relay 13 and by the auxiliary contacts 5$^b$ associated with running switch 5 and the same is also controlled by normally closed auxiliary contacts 8$^b$ associated with field switch 8. Said timing relay is provided with normally closed contacts 16$^b$, normally open contacts 16$^c$ and a dash-pot 16$^d$, and the latter contacts act through the medium of master relay 13 and auxiliary contacts 5$^b$ of running switch 5 to control the starting switch 2. Starting switch 1 is controlled by master relay 13 and also by auxiliary contacts 2$^b$ associated with starting switch 2. The running switch 5 is arranged to be connected across the distribution circuit through the medium of normally closed auxiliary contacts 2$^c$ associated with starting switch 2 and normally open auxiliary contacts 8$^c$ associated with field switch 8, and as hereinafter set forth upon establishment of running connections a resistance $r$ is included in circuit with the operating winding of said running switch through opening of auxiliary contacts 9$^b$ associated with field switch 9.

Voltage responsive relay 20 is controlled by master relay 13 and the same controls the field switches 7 and 8. The voltage responsive relay 21 controls the circuit breaker relay 22 through the medium of normally open auxiliary contacts 9$^c$ associated with field switch 9, normally closed contacts 16$^b$ associated with timing relay 16 and normally open auxiliary contacts 5$^c$ associated with running switch 5. Relay 22 in closing provides for operation of the automatic reclosing circuit breaker, as hereinafter set forth. Also, for purposes hereinafter set forth relay 22 is provided with normally closed auxiliary contacts 22$^b$ for controlling a resistance $r^2$ in the energizing circuit of the voltage responsive relay 20.

The function and operation of the aforedescribed controller together with the circuit connections therefor will now be more fully described in connection with Fig. 2. Assuming that the parts are in the position shown in Fig. 1, upon closure of the master switch 12, switch 13 is energized by a circuit extending from line L$^1$ through said master switch, through the operating winding of relay 13 and thence through the overload relay 14 and timing device 15 to line L$^2$. Running switch 5 being in open position the heater 15$^a$ of the timing device 15 is energized upon closure of switch 13 by a circuit extending from line L$^1$ through the right hand pole of switch 13 through the auxiliary contacts 5$^b$ of said running switch and thence through the heater 15$^a$ to line L$^2$. Also immediately upon closure of switch 13 the timing relay 16 is energized by a circuit extending from line L$^1$ through the right hand pole of switch 13 through auxiliary contacts 5$^b$ of running switch 5 to and through the operating winding 16$^a$ of said timing relay and thence through the auxiliary contacts 8$^b$ of field switch 8 to line L$^2$. In responding the timing relay 16 establishes an energizing circuit for starting switch 2 extending from line L$^1$ through the right hand pole of switch 13 through auxiliary contacts 5$^b$ of running switch 5 to and through the operating windings 2$^a$ of said starting switch and thence through the contacts 16$^c$ of the timing relay to line L$^2$. Upon closure of starting switch 2 the operating winding 1$^a$ of starting switch 1 is connected across lines L$^1$ and L$^2$ through the medium of auxiliary contacts 2$^b$ of said starting switch and the right hand pole of switch 13.

Upon closure of starting switches 1 and 2, the auto-transformer coils 3 and 4 are connected across lines L$^1$—L$^2$ and L$^2$—L$^3$, respectively, two of the terminals of the armature A are connected to intermediate taps on said coils, and the other terminal of the armature A is directly connected to line L$^2$. The armature is thus supplied with low voltage starting current from the supply circuit, and the motor will start with its field F connected in shunt across the step of resistance R$^1$ through the medium of the upper pole of the knife switch 10 and the normally closed contacts 7$^b$ of field switch 7.

Immediately upon closure of the switch 13 as above described the voltage relay 20 is connected across the terminals of the generator by a circuit extending from the left hand terminal of the armature A$^1$ through the left hand pole of switch 13 to and through the operating winding 20$^a$ of said voltage relay, and then through auxiliary contacts 22$^b$ and the series field F$^1$ to the right hand terminal of the armature A$^1$. When voltage of the generator builds up to a predetermined value, relay 20 responds and in responding connects the operating windings of switches 7 and 8 in parallel across the terminals of the generator. Field switches 7 and 8 in responding connect the field F of motor M across the terminals of the generator by a circuit extending from the left hand terminal of the generator through field switch 8, through the lower pole of knife switch 10 through rheostat RH and resistances R$^2$ and R$^1$, through the field F, through the upper pole of knife switch 10 and contacts 7$^c$ of field switch 7 and through the operating winding 21$^a$ of relay 21 to the right hand terminal of the generator.

Immediately upon response of field switch 8 the timing relay 16 is deenergized through opening of the auxiliary contacts 8ᵇ of said field switch, and said timing relay then returns to normal position against the action of its dash-pot 16ᵈ. Upon return of the timing relay 16 to normal position the starting switch 2 is deenergized through opening of contacts 16ᶜ and said starting switch in opening deenergizes the starting switch 1 by opening of contacts 2ᵇ. Upon opening of starting switch 2 the running switch 5 is energized by a circuit extending from the left hand terminal of the generator through the auxiliary contacts 9ᵇ associated with field switch 9 to and through the operating winding 5ᵃ of the running switch and then through the auxiliary contacts 2ᶜ associated with starting switch 2 and the auxiliary contacts 8ᶜ associated with field switch 8 to the right hand terminal of the generator. In responding running switch 5 connects the motor M directly to lines L¹, L² and L³ and the auxiliary contacts 5ᶜ of said running switch connect the operating winding 9ᵃ of field switch 9 across the terminals of the generator. Field switch 9 then responds and shunts the resistances R¹ and R² to strengthen the field of the motor for running and the auxiliary contacts 9ᵇ in opening insert the resistance r in the energizing circuit of running switch 5. Also upon closure of running switch 5 the auxiliary contacts 5ᵇ thereof interrupt the energizing circuit of heater 15ᵃ.

In connection with the foregoing it should be noted that the heater 15ᵃ is maintained energized as long as the starting connections are maintained. Heater 15ᵃ is designed to effect response of the thermal device 15 after a given interval, and if the running connections are not established within such interval for any reason said thermal device effects deenergization of the master relay 13 for interruption of the energizing circuits of the starting switches. Furthermore, it should be noted that variation of the field strength of the motor in the manner above described tends to minimize line disturbances upon establishment of running connections.

It should also be noted in connection with the foregoing that the running switch 5 is energized by current in the distribution circuit and that in order to deenergize the same it is necessary for the master relay 13 and the voltage relay 20 to open in the order named. A time element is thus introduced to prevent opening and reclosure of the running switch 5 upon voltage dips in the supply circuit such as may be caused by short-circuits in the system or by hunting of the motor.

Upon establishment of the aforedescribed running connections voltage relay 21 responds and after a predetermined interval timing relay 16 returns to normal position. Switch 22 is then energized by a circuit extending from the left hand terminal of the generator through the contacts 9ᶜ of the field switch 9 to and through the operating winding 22ᵃ through the relay 21 and thence through the contacts 16ᵇ of the timing relay and the auxiliary contacts 5ᶜ of the running switch to the right hand terminal of the generator. Switch 22 in responding acts through the medium of its contacts 22ᵇ to include resistance r² in the energizing circuit of the voltage relay 20. As is well known, upon failure of voltage in the supply circuit the master relay 13 tends to remain in closed position and maintain the voltage relay 20 energized. Since voltage relay 20 controls the running connections it is apparent that unless the same is exceedingly sensitive to voltage drops in the distribution circuit there is a possibility of the running connections being maintained upon restoration of voltage in the supply circuit. The aforementioned resistance r² which is controlled by the auxiliary contacts 22ᵇ of relay 22 is of such value as to insure opening of the voltage responsive relay upon a slight drop in the voltage in the distribution circuit.

As before stated, switch 22 controls the automatic reclosing circuit breaker CB and, as shown in Fig. 1, said circuit breaker is provided with a closing coil 25, the energizing circuit of which is controlled by an overload relay 26 and an auxiliary switch 27. Overload relay 26 is responsive to load conditions in the distribution circuit, while the switch 27 is biased to closed position, and, upon closure of the circuit breaker the same is moved to open position and is held therein by a latch 28. When switch 27 is in open position a resistance R⁸ is included in the energizing circuit of the closing coil 25, said resistance being of such value that the same limits current to the operating coil to an amount just sufficient to hold the circuit breaker in closed position but insufficient to move the same to open position. Latch 28 is provided with a tripping coil 29, the energizing circuit of said coil being controlled by a normally closed auxiliary switch 30. Switch 30 is adapted to open upon closure of the circuit breaker and upon opening of said circuit breaker the same moves to open position against the action of a dash-pot 31. The control means for the circuit breaker further includes resistances R⁹ and R¹⁰, said resistances being connected as shown in the drawing for purposes hereinafter set forth.

With the parts of the circuit breaker in the position shown in Fig. 2, it will be observed that if the current conditions in the distribution circuit are normal tripping coil 29 will be energized immediately upon closure of switch 22 by a circuit extending from a point 32 in one of the lines through the right hand pole of switch 22, through resistance R⁹, through said tripping coil and through the auxiliary switch 30 to a point 33 in the other line. Tripping coil 29 will thus release latch 28 for closure of switch 27, and said switch in closing excludes the resistance R⁵. The operating coil 25 is then connected between points 32 and 33 and the circuit breaker will close and will remain in closed position as long as the current conditions in the distribution circuit are normal.

Upon voltage failure the winding 25 will be deenergized and the circuit breaker will reclose only after the dash-pot retarded switch 30 returns to normal position. Upon overload conditions in the distribution circuit relay 26 opens to interrupt the energizing circuit of winding 25 and the tripping coil 29 will remain unresponsive until the current conditions in the distribution circuit return to normal. Assuming that the circuit breaker has been tripped and the parts are in the position shown in Fig. 1, it will be observed that when the overload or short-circuit exists in the distribution circuit D—C there are two paths whereby current may flow from the point 32 to the point 33, one of said paths being through the resistance R⁹, coil 29 and switch 30, and the other being through resistances R⁹ and R¹⁰ and the load or short-circuit on the distribution circuit. Coil 29 is wound with a low resistance so that a slight variation in the resistance of the distribution circuit will cause a corresponding change of current through said coil. Thus, if the load on the distribution circuit is of low resistance a large part of the current will be shunted round the coil 29, but as soon as the short-circuit is removed or the resistance of the circuit increased to a value which would not permit excessive current to flow were the circuit breaker to reclose, enough current will pass through the coil 29 to avoid tripping of the latch 28 for reclosing of the circuit breaker.

What I claim and desire to secure by Letters Patent is:

1. In combination, an alternating current supply circuit, a direct current distribution circuit, a rotary transformer having a field winding, means for establishing low voltage connections from said supply circuit to said transformer for starting and for thereafter connecting said transformer directly to said supply circuit for running and providing for excitation of said field from the direct current side of said transformer at a reduced voltage upon establishment of starting connections and at an increased voltage upon establishment of running connections.

2. In combination, a supply circuit, a distribution circuit, a motor generator set, the motor of said set having a field winding to be supplied with current from the generator of said set, means for selectively establishing low voltage starting connections and full voltage running connections for said motor from said supply circuit, means for connecting said generator to said distribution circuit after starting of said motor, and means providing for excitation of said field winding by said generator at a reduced voltage upon establishment of starting connections and at an increased voltage upon establishment of running connections.

3. In combination, an alternating current supply circuit, a direct current distribution circuit, a motor generator set, a plurality of electroresponsive switches, certain for establishing low voltage starting connections for the motor of said set from said supply circuit and certain others for establishing full voltage running connections therefor from said supply circuit, and control means for said switches providing for energization of said former switches from said supply circuit and for energization of the latter by current from the generator of said set.

4. In combination, a supply circuit, a distribution circuit, a motor generator set including a synchronous alternating current motor and a direct current generator, the former having a field winding to be supplied with current from the latter, control means for said motor including means for establishing reduced voltage armature connections for starting and full voltage armature connections for running, and control means for the field winding of said motor including a relay responsive upon establishment of starting connections for said motor to provide for excitation of said field winding from said generator at a reduced voltage and a second relay responsive upon establishment of running connections for said motor to provide for excitation of said field winding at an increased voltage.

In witness whereof, I have hereunto subscribed my name.

EDWIN W. SEEGER.